United States Patent
Chen

(10) Patent No.: US 8,906,977 B2
(45) Date of Patent: Dec. 9, 2014

(54) POLYETHER POLYOL BASED-PREMIX COMPOSITION AND FOAMING COMPOSITION CONTAINING THE PREMIX COMPOSITION

(76) Inventor: Chien-Chang Chen, Tainan (TW)

(*) Notice: Subject to any disclaimer, the term of this patent is extended or adjusted under 35 U.S.C. 154(b) by 363 days.

(21) Appl. No.: 13/433,997

(22) Filed: Mar. 29, 2012

(65) Prior Publication Data

US 2013/0261204 A1 Oct. 3, 2013

(51) Int. Cl.
*C08L 75/08* (2006.01)
*C09K 3/00* (2006.01)

(52) U.S. Cl.
USPC .......................................................... 521/170

(58) Field of Classification Search
CPC ........... C08G 18/4833; C08G 18/4837; C08G 18/4841; C08G 18/4845; C08G 18/485; C08G 18/4018
USPC .......................................................... 521/170
See application file for complete search history.

(56) References Cited

U.S. PATENT DOCUMENTS

| 6,849,666 B2* | 2/2005 | Van der Wal et al. .......... 521/159 |
| 8,592,623 B2* | 11/2013 | Roers et al. ....................... 560/90 |
| 2002/0025990 A1* | 2/2002 | Fujita et al. ..................... 521/173 |
| 2009/0253821 A1 | 10/2009 | Iwase et al. |
| 2009/0313909 A1* | 12/2009 | Clatty et al. .................... 52/2.11 |
| 2010/0168262 A1* | 7/2010 | Sasaki et al. .................. 521/123 |
| 2011/0009515 A1* | 1/2011 | Casati ............................ 521/170 |

FOREIGN PATENT DOCUMENTS

| TW | 200823242 | 6/2008 |
| WO | 2007/142425 | 12/2007 |

* cited by examiner

*Primary Examiner* — Mike M Dollinger
(74) *Attorney, Agent, or Firm* — Ohlandt Greeley Ruggiero & Perle L.L.P.

(57) ABSTRACT

A premix composition includes polyether polyol and a blowing agent, wherein the polyether polyol is a copolymer of propylene oxide and trimethylolpropane, a copolymer of propylene oxide, ethylene oxide and trimethylolpropane, a copolymer of propylene oxide, ethylene oxide and glycerol, or combinations thereof. A foaming composition which is obtained by mixing the premix composition with diisocyanate.

6 Claims, No Drawings

POLYETHER POLYOL BASED-PREMIX COMPOSITION AND FOAMING COMPOSITION CONTAINING THE PREMIX COMPOSITION

BACKGROUND OF THE INVENTION

1. Field of the Invention

The present invention relates to premix and foaming compositions for a polyurethane foam.

2. Description of the Related Art

A polyurethane foam is an important material for industrial and civilian fields, and is widely used in furnishing, packaging, textile, and insulating materials. Typically, the polyurethane foam is formed by polymerization of diisocyanate, polyol and a chain extender, e.g., diol or diamine compounds. The drawbacks of the polyurethane foam include insufficient hydrolytic stability, deterioration and yellowing under high humidity, high temperatures and UV light exposure.

TW Publication Application No. 200823242 discloses a formulation of a non-yellowing polyurethane foam made by first preparing a prepolymer that includes at least one aliphatic isocyanate and at least one polyol, followed by addition of other additives such as a crosslinking agent, a surfactant, a catalyst, a blowing agent and water in the prepolymer to undergo emulsification and foaming reaction. However, the blowing agent used is a volatile organic solvent, such as pentane and dichloromethane, which poses harm to both humans and the environment.

US Publication Application No. 2009/0253821 A1 discloses a polyurethane foam with water absorbency and yellowing resistance. The polyurethane foam is obtained by reacting a polyester polyol, an alicyclic polyisocyanate, a water-absorbency-imparting agent, a catalyst and a blowing agent. However, since the water-absorbency-imparting agent enhances the hydrophilic property of the foam, the moisture retained in the foam might result in hydrolytic instability. In addition, the polyester polyol disclosed in the US publication is in a solid state or a liquid state with high viscosity. This requires heating or addition of solvents during a pretreatment step, and is thus less convenient to use.

WO2007/142425 A1 discloses a process for preparing a polyurethane foam with yellowing resistance via the reaction of (di)isocyanate with polyether polyol. In the PCT publication, the yellowing resistance effect of the foam is achieved by addition of a polyvinyl compound in polyether polyol, i.e., polyether polyol B. That is, in the PCT publication, the used polyether polyol per se cannot provide anti-yellowing property.

SUMMARY OF THE INVENTION

According to a first aspect, this invention provides a premix composition comprising polyether polyol and a blowing agent, wherein the polyether polyol is selected from the group consisting of a copolymer of propylene oxide and trimethylolpropane, a copolymer of propylene oxide, ethylene oxide and trimethylolpropane, a copolymer of propylene oxide, ethylene oxide and glycerol, and combinations thereof.

A second aspect of this invention provides a foaming composition comprising the aforesaid premix composition and diisocynate.

DETAILED DESCRIPTION OF THE PREFERRED EMBODIMENTS

The present invention is directed to a premix composition and a foaming composition containing the premix composition and diisocyanate. The premix composition includes polyether polyol and a blowing agent. The polyether polyol is selected from the group consisting of a copolymer of propylene oxide and trimethylolpropane, a copolymer of propylene oxide, ethylene oxide and trimethylolpropane, a copolymer of propylene oxide, ethylene oxide and glycerol, and combinations thereof.

The polyether polyol used in the present invention has low viscosity and high fluidity under room temperature, and requires little pretreatment during the manufacturing process.

In this invention, the propylene oxide and ethylene oxide are ring-opened and further reacted to form the polyether polyol having hydroxyl groups. The hydroxyl groups of the polyether polyol are reacted with diisocyanate by virtue of polymerization reaction to increase crosslink density. A resultant foam product thus has better thermal stability and fewer occurrences of heat decomposition as well as better physical properties, such as hardness and tensile strength. In addition, polyether polyol has better hydrolytic stability when compared to polyester polyol used in conventional polyurethane foams. Thus, the resultant foam product is unlikely to be hydrolyzed after adsorbing moisture or under humid environment.

The polyether polyol in the premix composition can include commercially available polyether polyol to provide a variety of desired physical properties. Examples of the commercially available polyether polyol include, but are not limited to, VORALUX HF 505 (from Dow Chemical Company).

Preferably, the weight average molecular weight of polyether polyol is in the range from 3000 to 5000.

In the premix composition of this invention, when the content of ethylene oxide is too high, the viscosity of polyether polyol will be increased, which is not beneficial for the further manufacturing process.

Preferably, in the premix composition of this invention, based on the total weight of propylene oxide and ethylene oxide, the amount of ethylene oxide ranges from 0 wt % to 30 wt %, more preferably, from 15 wt % to 30 wt %.

The blowing agent is used to produce significant amount of gas by virtue of the volatile property thereof. Thus, the blowing agent can be reacted with diisocyanate to form the foam product by virtue of a foaming reaction. Preferably, the blowing agent may be selected from water, organic solvent, and a combination thereof.

The blowing agent in the preferred embodiment of the present invention is water. This is ecologically friendly and poses no harm to humans.

The amount of water added affects the foaming properties and the physical properties of the resultant foam product, such as mechanical strength, heat resistance and light resistance. The reaction of excess amount of water with diisocyanate results in the release of carbon dioxide along with significant amount of heat, leading to the instability of the resultant foam product. Thus, collapse, deterioration or slight yellowing of the foam product may occur with the possibility of ashing. When there is unduly low amount of water, the gas produced is insufficient, and cannot reach ideal foaming density.

Preferably, based on 100 parts by weight of polyether polyol, the blowing agent is in the range from 2.7 to 4.4 parts by weight; more preferably, from 3 to 3.44 parts by weight.

The premix composition may optionally include a catalyst, a light and heat absorbent, a surfactant, or a chain extender.

The purpose of the catalyst is to catalyze the polymerization and foaming reaction. Examples of the catalyst include a metal catalyst, an amine catalyst and the combination thereof. The combination of the metal catalyst and the amine catalyst is preferable.

The metal catalyst can effectively catalyze the polymerization between the diisocyanate and polyether polyol. The amine catalyst can effectively catalyze the foaming reaction between water and diisocyanate. Thus, the addition of suitable amount of metal and amine catalysts can balance the polymerization and foaming reaction, and prevent the foam product from collapsing or contracting.

Examples of the metal catalyst include, but are not limited to, stannous octoate, dibutyltin dilaurate, and the combination thereof.

Examples of the amine catalyst include, but are not limited to, bis(2-methylaminoethyl)ether, triethylene diamine, Dabco 33-LV (Air Product and Chemical Inc.), and combinations thereof.

Preferably, based on 100 parts by weight of polyether polyol, the catalyst is in the range from 1.1 to 2.1 parts by weight; more preferably, from 1.52 to 1.85 parts by weight.

The purpose of the light and heat absorbent is to absorb light and heat during the foaming process, thereby lowering the occurrence of yellowing and deterioration of the foam product, and providing thermal stability. Examples of the light and heat absorbent include, but are not limited to, UV607, UV608 and UV638 (Liseng Development Plasticizing Limited Co., Ltd.) and Chrisorb 328 (Double Bond Chemical IND., Co., Ltd.)

Preferably, based on 100 parts by weight of the polyether polyol, the light and heat absorbent is present in an amount ranging from 3 to 3.8 parts by weight; more preferably, from 3 to 3.33 parts by weight.

The purpose of the surfactant is to increase the dispersion among the components of the premix and foaming compositions. For example, the surfactant allows the blowing agent to be evenly dispersed within the polyether polyol. Examples of the surfactants include 284A (Dow Chemical Company), TEGOSTAB® B 8239 (Degussa), L-626 (Crompton Corporation), L-580 (Crompton Corporation) and 294A (Dow Chemical Company).

Preferably, based on 100 parts by weight of polyether polyol, the surfactant is present in an amount ranging from 1 to 1.3 parts by weight; more preferably, from 1 to 1.25 parts by weight.

The premix composition of this invention may include polyester polyol which is in a liquid form. The purpose of polyester polyol is to adjust the foam product to obtain desired physical properties. Preferably, the polyester polyol is a copolymer of adipic acid and diol. The diol is 2-butyl-2-ethyl-1,3-propanediol or 3-methyl-1,5-pentanediol.

The polyester polyol used in the present invention is in the liquid state and thus exhibits good compatibility with polyether polyol and is less reactive with air. In this invention, combination of polyether polyol and the polyester polyol in the liquid state would provide the foam product with better anti-hydrolytic and anti-deteriorating properties.

Preferably, based on 100 parts by weight of polyether polyol, the polyester polyol is present in an amount ranging from 11 to 25 parts by weight; more preferably, from 11.11 to 25 parts by weight. Excess amount of polyester polyol will result in contraction of the foam product.

The purpose of the chain extender is to perform crosslinking reaction with diisocyanate and assist the foam to form an ideal shape. Generally, the chain extender is alcohol or amine with low molecular weight. During polymerization and foaming reaction, the chain extender competes with polyether polyol and water, therefore affecting the foaming properties of the foam. Thus, one of the factors determining the foaming properties is the quantity and quality of the chain extender.

Examples of the chain extender include glycerine, ethylene glycol, triethanolamine, 1,4-butane diol, diethylene glycol, dipropylene glycol, and combinations thereof. Preferably, the chain extender is glycerine, ethylene glycol or the combination thereof.

Preferably, based on 100 parts by weight of polyether polyol, the chain extender is present in an amount ranging from 2 to 3.8 parts by weight; more preferably, from 3 to 3.75 parts by weight.

In the premix composition of this invention, the polyether polyol and polyester polyol are both in a liquid state under room temperature, and thus can be mixed in a container at room temperature (i.e., 15 to 40° C.).

The foaming composition of the present invention can be used to form the foam product by mixing the premix composition with diisocyanate under room temperature (15 to 40° C.), which involves polymerization, foaming and crosslinking reactions. The addition of diisocynate does not change the low viscosity and high fluidity properties of the premix composition.

Preferably, diisocyanate is aliphatic diisocyanate. More preferably, diisocyanate is selected from isophorone diisocyanate, hexamethylene diisocyanate, and the combination thereof.

Preferably, based on 100 parts by weight of the polyether polyol, diisocyanate is in the range of from 46.4 to 84.5 parts by weight; more preferably, from 51.96 to 69.73 parts by weight.

The foam product thus formed has a plurality of pores formed therein. The pores are formed due to the gas produced during the foaming process. The gas and heat produced during the foaming process must be released effectively to the external environment from a surface of the foam product to prevent contraction or collapse of the foam product. Thus, in a conventional method for forming a foam product, a cell-opening agent is usually added in order to obtain desired porosity in the surface of the foam product for effective release of gas and heat. The foaming composition of the present invention can be used to form a foam product having ideal porosity on a surface without addition of a cell-opening agent.

The polyurethane foam product made by the foaming composition of this invention can be used in a variety of applications, including female underwear, pads, seating cushion, sponge and shoe sole. Since the resultant foam product has non-yellowing properties, it can be used with transparent covers and textiles.

EXAMPLES

This invention will be further described by way of the following examples. However, it should be understood that the following examples are solely intended for the purpose of illustration and should not be construed as limiting the invention in practice.

<Source of Chemicals>
1. Polyether polyol:
   (1) ENHOL TBP-3050 (hereinafter referred to as "TP3050"): copolymer of propylene oxide, ethylene oxide and trimethylolpropane, content of ethylene oxide is 30 wt %. Mw: 5000, purchased from En Hou Polymer Chemical Ind., Co., Ltd.
   (2) ENHOL GCP-1544 (hereinafter referred to as "GP1544"): copolymer of propylene oxide, ethylene oxide and glycerol, content of ethylene oxide is 15 wt %. Mw: 4400, purchased from En Hou Polymer Chemical Ind., Co., Ltd.
(3) ENHOL TP-250 (hereinafter referred to as "TP250"): copolymer of propylene oxide and trimethylolpropane. Mw: 3000, purchased from En Hou Polymer Chemical Ind., Co., Ltd.
(4) VORALUX HF505 (hereinafter referred to as "HF505"): Polyether polyol. Mw: 120000, purchased from Dow Chemical Company.
2. Catalyst:
(1) stannous octoate (Dabco T-9, hereinafter referred to as "T9"), purchased from Air Product and Chemical Inc.
(2) dibutyltin dilaurate (Dabco T-12, hereinafter referred to as "T12"), purchased from Air Product and Chemical Inc.
(3) bis(2-dimethylaminoethyl)ether with 30% dipropylene glycol (hereinafter referred to as "BL-11"), purchased from Air Product and Chemical Inc.
(4) triethylenediamine (hereinafter referred to as "TEDA"), purchased from Air Product and Chemical Inc.
3. Isophorone diisocyanate (hereinafter referred to as "IPDI") purchased from Bayer, Mw: 222.3.
4. Hexamethylene 1,6-diisocyanate (hereinafter referred to as "HDI"): purchased from Asahi Kasei Corporation, Mw: 168.1.
5. Polyester polyol:
(1) copolymer of adipic acid and 2-butyl-2-ethyl-1,3-propanediol (hereinafter referred to as "5900"): purchased from Eternal Chemical Co., Ltd. Mw: 3000;
(2) copolymer of adipic acid and 3-methyl-5-pentanediol (hereinafter referred to as "5550"): purchased from Eternal Chemical Co., Ltd. Mw: 2000.
6. Light and heat absorbent: ESK-UV608 (hereinafter referred to as "UV608"), purchased from Liseng Development Plasticizing Limited Co., Ltd.
7. Chain extender:
(1) glycerol (hereinafter referred to as "GC"): purchased from Kanto, Mw: 92.09
(2) ethylene glycol (hereinafter referred to as "EG"): purchased from Katayama, Mw: 60.07
8. Surfactant:
(1) 284A: purchased from Dow Chemical Company;
(2) TEGOSTAB® B 8239: purchased from Evonik-Degussa GmbH.

Examples 1 to 12

Polyether polyol, polyester polyol, a chain extender, a blowing agent, a catalyst, a surfactant and an anti-UV agent were mixed under 1000 rpm for 60 seconds to obtain a premix composition. The amounts of the aforesaid components are listed in Table 1.

Thereafter, diisocynate was added to and reacted with the premix composition until thermal equilibration of the reaction has been reached. The mixture was poured into a paper box and allowed to ripen at room temperature, thereby obtaining a foam product.

<Standard Testing Methods>:

The foam products of Examples 1 to 12 were placed under room temperature for two hours and were subjected to the following standard physical tests:
1. Anti-yellowing: determined according to ASTM-D1148-1995.
2. Pyrolysis: determined according to ASTM-D1148-1995.
3. Density: determined according to JIS K-6400.
4. Hardness: determined according to JIS K-6400.
5. Tear strength: determined according to JIS K-6400.
6. Tensile yield strength: determined according to JIS K-6400.
7. Elongation: determined according to JIS K-6400.
8. Rebound resilience: determined according to JIS K-6400.
9. Hydrolytic stability: the foam products obtained from Examples 10 to 12 were immersed in water and placed in an oven at 70° C. for three days. Thereafter, the foam products were dried in the oven at 70° C. for another three days. The foam products were subjected to the standard tests for tear strength, tensile yield strength and elongation. Results shown are the average of duplicate determinations.

TABLE 1

| Component (Unit: parts by weight) | | 1 | 2 | 3 | 4 | 5 | 6 | 7 | 8 | 9 | 10 | 11 | 12 |
|---|---|---|---|---|---|---|---|---|---|---|---|---|---|
| Polyether polyol | TP250 | — | — | — | — | — | — | — | — | — | — | 100 | 100 | — |
| | GP1544 | 80 | — | — | 90 | 70 | 60 | — | — | — | — | — | — |
| | TP3050 | — | 100 | 100 | — | — | — | 100 | 100 | 100 | — | — | 100 |
| | HF505 | 20 | — | — | 10 | 30 | 40 | — | — | — | — | — | — |
| Polyester polyol | 5900 | — | — | — | — | — | — | — | — | — | 25 | 11.11 | — |
| | 5550 | — | — | — | — | — | — | — | — | — | — | — | 25 |
| Chain extender | EG | — | 3 | — | — | — | — | 3 | — | 3 | 3.75 | 3.33 | 3.75 |
| | GC | — | — | 2 | — | — | — | — | 2 | — | — | — | — |
| Diisocyanate | IPDI | 46.48 | 46.65 | 43.7 | 46.48 | 46.48 | 46.48 | 51.84 | 61.11 | 54.95 | 84.47 | 35 | 69.73 |
| | HDI | — | 8.82 | 8.26 | — | — | — | 9.8 | — | 10.37 | — | 18.48 | — |
| Blowing agent | water | 3 | 3 | 3 | 3 | 3 | 3 | 3.5 | 3.5 | 3.5 | 4.38 | 2.78 | 3.44 |
| Catalyst | T9 | 0.38 | 0.38 | 0.38 | 0.38 | 0.38 | 0.38 | 0.38 | 0.38 | 0.38 | 0.38 | 0.421 | 0.476 |
| | T12 | 0.38 | 0.38 | 0.38 | 0.38 | 0.38 | 0.38 | 0.38 | 0.38 | 0.38 | 0.38 | 0.421 | 0.476 |
| | TEDA | 0.38 | 0.38 | 0.38 | 0.38 | 0.38 | 0.38 | 0.445 | 0.445 | 0.445 | 0.445 | 0.349 | 0.439 |
| | BL-11 | — | 0.38 | — | — | — | — | 0.445 | 0.445 | 0.445 | 0.445 | 0.349 | 0.439 |
| Surfactant | 284A | — | — | — | — | — | — | — | 1 | — | 1.25 | 1.11 | — |
| | 8239 | 1 | 1 | 1 | 1 | 1 | 1 | 1 | — | 1 | — | — | 1.25 |
| Anti-UV agent | UV608 | 3 | 3 | 3 | 3 | 3 | 3 | 3 | 3 | 3 | 3.75 | 3.33 | 3.75 |

"—" indicates not added

TABLE 2

Standard testings

| Examples | Anti-Yellowing index | Pyrolysis | Density (kg/m³) | Hardness ASKER (° F.) | Tear strength (kg/cm²) Immersing in water | | Tensile yield strength (kg/cm²) Immersing in water | | Elongation (%) Immersing in water | | Rebound resilience (%) |
|---|---|---|---|---|---|---|---|---|---|---|---|
| | | | | | Before | After | Before | After | Before | After | |
| 1 | 5 | No ash on surface | 42 | 29.8 | 0.85 | — | 0.9 | — | 121.3 | — | 32 |
| 2 | 5 | No ash on surface | 38.4 | 36 | 0.81 | — | 0.81 | — | 133.8 | — | 43 |
| 3 | 5 | No ash on surface | 38.2 | 55.8 | 0.73 | — | 0.72 | — | 101.3 | — | 30 |
| 4 | 5 | No ash on surface | 41.5 | 28.3 | 1.09 | — | 0.92 | — | 126.1 | — | 30 |
| 5 | 4.5 | No ash on surface | 42.3 | 34.2 | 0.82 | — | 1.1 | — | 135.6 | — | 36 |
| 6 | 4.5 | No ash on surface | 42 | 38.8 | 0.8 | — | 0.85 | — | 124.4 | — | 40 |
| 7 | 5 | No ash on surface | 32.7 | 35.1 | 0.8 | — | 0.66 | — | 121.9 | — | 37 |
| 8 | 5 | No ash on surface | 41.3 | 77.6 | 0.61 | — | 0.53 | — | 95.8 | — | 32 |
| 9 | 5 | No ash on surface | 37.5 | 42.1 | 1.13 | — | 0.88 | — | 108.8 | — | 37 |
| 10 | 5 | No ash on surface | 35 | 76 | 0.86 | 0.85 | 0.99 | 0.97 | 138.8 | 142.1 | 25 |
| 11 | 5 | No ash on surface | 41 | 22.1 | 0.48 | 0.5 | 0.48 | 0.46 | 136.9 | 145.9 | 36 |
| 12 | 5 | No ash on surface | 39.9 | 58.8 | 1.1 | 1.18 | 1.05 | 1.13 | 251.9 | 285.7 | 22 |

"—" indicates not measured.

As shown in Table 2, the foam products obtained from Examples 1 to 12 exhibit superior anti-yellowing and anti-deterioration properties. Density, hardness, tear strength, tensile yield strength, elongation, and rebound resilience all met industrial standards. Tear strength, tensile yield strength and elongation of the foam products obtained from Examples 10 to 12 have no significant changes before and after immersing in water, suggesting good hydrolytic stability in these foam products.

To sum up, the polyether polyol contained in the premix and foaming compositions of the present invention has low viscosity and thus simplifies the manufacturing process. The addition of diisocynate to the premix composition does not affect the low viscosity of the mixture and allows the mixture to be at a liquid state. In addition, the polyether polyol of the premix and foaming compositions of the present invention provides a polyurethane foam with superior physical properties, such as anti-yellowing property, anti-deteriorating effect and hydrolytic stability.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A foaming composition, comprising:
   polyether polyol having a weight average molecular weight that ranges from 3000 to 5000;
   diisocyanate selected from the group consisting of isophorone diisocyanate, hexamethylene diisocyanate, and the combination thereof;
   a blowing agent;
   a catalyst;
   an anti-UV agent light and heat absorbent;
   a surfactant; and
   a chain extender,
   wherein said polyether polyol is selected from the group consisting of a copolymer of propylene oxide, ethylene oxide and trimethylolpropane, a copolymer of propylene oxide, ethylene oxide and glycerol, and the combinations thereof, the amount of ethylene oxide ranging from 0 wt % to 30 wt % based on the total weight of the copolymer,
   wherein, based on 100 parts by weight of said polyether polyol, said diisocyanate is 46.4 to 84.5 parts by weight, said blowing agent is 2.7 to 4.4 parts by weight, said catalyst is 1.1 to 2.1 parts by weight, said light and heat absorbent is 3 to 3.8 parts by weight, said surfactant is 1 to 1.3 parts by weight, and said chain extender is 2 to 3.8 parts by weight.

2. The foaming composition according to claim 1, further comprising polyester polyol.

3. The foaming composition according to claim 2, wherein based on 100 parts by weight of said polyether polyol, said polyester polyol is 11 to 25 parts by weight.

4. The foaming composition according to claim 2, wherein said polyester polyol includes a copolymer of hexanedioic acid and diol.

5. The foaming composition according to claim 4, wherein said diol is selected from the group consisting of 2-butyl-2-ethyl-1,3-propanediol and 3-methyl-1,5-pentanediol.

6. The foaming composition according to claim 1, wherein said diisocyanate is selected from the group consisting of isophorone diisocyanate, hexamethylene diisocyanate, and the combination thereof.

* * * * *